United States Patent
Holtzman et al.

(10) Patent No.: US 6,404,760 B1
(45) Date of Patent: Jun. 11, 2002

(54) CDMA MULTIPLE ACCESS INTERFERENCE CANCELLATION USING SIGNAL ESTIMATION

(75) Inventors: Jack Holtzman, San Diego, CA (US); Dilip G. Warrier, Urbana, IL (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/356,610

(22) Filed: Jul. 19, 1999

(51) Int. Cl.[7] .................. H04J 11/00; H04B 7/216; H03D 1/04

(52) U.S. Cl. .............. 370/342; 370/209; 370/335; 370/346; 370/441; 375/144; 375/346

(58) Field of Search ................ 370/342, 346, 370/335, 561, 209, 320, 441, 286, 289, 406, 408, 407; 375/200, 205, 261, 227, 298, 346

(56) References Cited

U.S. PATENT DOCUMENTS

| | | | |
|---|---|---|---|
| 4,901,307 A | | 2/1990 | Gilhousen et al. ............ 370/18 |
| 5,056,109 A | | 10/1991 | Gilhousen et al. ............. 375/1 |
| 5,101,501 A | | 3/1992 | Gilhousen et al. ........... 455/33 |
| 5,103,459 A | | 4/1992 | Gilhousen et al. ............. 375/1 |
| 5,305,349 A | * | 4/1994 | Dent .......................... 370/209 |
| 5,325,394 A | * | 6/1994 | Bruckert ..................... 375/200 |
| 5,418,814 A | | 5/1995 | Hulbert ....................... 375/205 |
| 5,568,473 A | * | 10/1996 | Hemmati ..................... 370/342 |
| 5,602,833 A | | 2/1997 | Zehavi ........................ 370/209 |
| 5,719,852 A | | 2/1998 | Schilling et al. ............ 370/201 |
| 5,740,208 A | * | 4/1998 | Hulbert et al. .............. 375/346 |
| 5,862,124 A | * | 1/1999 | Hottinen et al. ............ 370/335 |
| 6,067,292 A | * | 5/2000 | Huang et al. ................ 370/342 |
| 6,157,685 A | * | 12/2000 | Tanaka et al. ............... 375/346 |
| 6,157,847 A | * | 12/2000 | Buehrer et al. ............. 455/561 |
| 6,192,067 B1 | * | 2/2001 | Toda et al. .................. 375/144 |

FOREIGN PATENT DOCUMENTS

| | | |
|---|---|---|
| EP | 0776105 | 5/1997 |
| EP | 0823796 | 2/1998 |
| EP | 0923199 | 6/1999 |
| WO | 9611534 | 4/1996 |

OTHER PUBLICATIONS

Sawahashi, et al. "Pilot Symbol–Assisted Coherent Multistage Interference Canceller Using Recursive Channel Estimation for DS–CDMA Mobile Radio" IEICE Trans. Commun. E79–B(9): 1262–1269 (1996).

Divsalar, et al. "Improved Parallel Interference Cancellation for CDMA" IEEE Transactions on Communications 46(2): 258–268 (1998).

Duel–Hallen, et al. "Multiuser Detection for CDMA Systems" IEEE Personal Communications 2(2): 46–58 (1995).

Hagenauer, J. "Forward Error Correcting for CDMA Systems" IEEE pp. 566–569 (1996).

(List continued on next page.)

*Primary Examiner*—Wellington Chin
*Assistant Examiner*—M. Phan
(74) *Attorney, Agent, or Firm*—Philip Wadsworth; Kent D. Baker

(57) ABSTRACT

Several methods and corresponding apparatus to reduce multiple access interference in code division multiple access communications systems through successive interference cancellation techniques. An estimate of reliability of cancellation of a strongest interfering signal is formed from analysis of a pilot signal associated with the strongest signal. The estimate is used to derive a weight that is multiplied by a replica of the strongest signal to provide a weighted replica. The weighted replica is subtracted from a delayed version of the received channel. As a result, interference cancellation is robustly implemented when the strongest signal replica is most likely to be accurate and is not robustly implemented when the strongest signal replica is not likely to be accurate. This avoids combining a replica of the strongest signal with the received channel when the replica is more likely to contribute additional interference rather than reduce it.

41 Claims, 4 Drawing Sheets

OTHER PUBLICATIONS

Kaiser, et al. "Multi–Carrier CDMA with Iterative Decoding and Soft–Interference Cancellation" Proc. Gloebcom., pp. 6–10 (1997).

Moshavi, S. "Multi–User Detection for DS–CDMA Communications" IEEE Communications Magazine: 124–136 (1996).

* cited by examiner

CDMA MULTIPLE ACCESS INTERFERENCE CANCELLATION USING SIGNAL ESTIMATION

BACKGROUND OF THE INVENTION

I. Field of the Invention

The invention relates to communication systems. More particularly, the invention relates to methods and apparatus for reducing multiple access interference in wireless communication systems that use code division multiple access techniques.

II. Description of the Related Art

Several multiple access communication techniques are known in the art, such as time division multiple access (TDMA) and frequency division multiple access (FDMA). However, the spread spectrum modulation techniques of code division multiple access (CDMA) provide significant advantages over other multiple access modulation. techniques for many applications. CDMA techniques in a communication system are disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING SIGNAL WAVEFORMS IN A CDMA CELLULAR TELEPHONE SYSTEM," both assigned to the assignee of the present invention.

CDMA modulation techniques can provide capacity improvements over other techniques, such as TDMA and FDMA, based in part on CDMA's use of orthogonal functions or codes. The CDMA codes are generated by, e.g., Walsh functions that mathematically form an orthogonal set. Thus, any two Walsh functions are orthogonal to each other, and signals encoded with two separate Walsh functions should cause no mutual interference when they are time aligned. An example of Walsh functions employed in a CDMA communication system is disclosed in U.S. Pat. No. 5,602,883, entitled "METHOD AND APPARATUS FOR USING WALSH SHIFT KEYING IN A SPREAD SPECTRUM COMMUNICATION SYSTEM," assigned to the assignee of the present invention. However, because multiple signals often are not time aligned, complete orthogonality is not achieved in practice. As a result, interference between otherwise orthogonal signals occurs. This is known as multiple access interference or MAI.

CDMA spreads the signal energy over a wide bandwidth. Therefore, fading of a CDMA signal is frequency selective. CDMA also provides space or path diversity through multiple signal paths that simultaneously link a mobile station or user with two or more cell-sites. Furthermore, CDMA can exploit the multipath environment by allowing a signal having multiple components each arriving at one receiver with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention.

Under one CDMA standard, described in the Telecommunications Industry Association's *TIA/EIA/IS-95-A Mobile Stations-Base Station Compatibility Standard for Dual-Mode Wideband Spread Spectrum Cellular System*, each base station transmits pilot, sync, paging and forward traffic channels to its users. According to this standard, the pilot signal is an unmodulated, direct-sequence spread spectrum signal transmitted continuously by each base station. The pilot signal allows each user to acquire information describing timing of signals within the channels transmitted by the base station, and provides a phase reference for coherent demodulation of these signals. The pilot channel also enables signal strength comparisons between base stations to determine when to hand off between base stations (such as when moving between cells).

CDMA modulation techniques require that all transmitters be under precise power control to in order to reduce interference between transmitted signals. When the power levels of signals transmitted by a base station to a user (the forward link) are too high, problems may be created, particularly MAI, as discussed above. As a result, most base stations have a fixed amount of power at which to transmit signals, and therefore can transmit to only a limited number of users. Alternatively, when the power levels of signals transmitted by the base station are too low, some users can receive multiple erroneous transmitted frames. Terrestrial channel fading and other known factors also affect the power levels of signals transmitted by the base station. Thus, each base station needs to independently adjust the transmission power of the signals it transmits to each of its users. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention.

Even with independent power adjustment, CDMA communications systems are interference limited. As a result, any reduction in interference levels translates directly into increased system capacity. Conventional CDMA receivers utilize an approach of decoding a single signal. In this approach, all other user signals are considered to be noise. A more general approach that optimizes detection of all user signals simultaneously is too computationally intensive for real-time applications. As a result, considerable effort is presently being devoted to simpler algorithms for multi-user detection that provide improvement over the conventional CDMA receiver, but that are not as complex or as computationally intensive as the optimum approach. Examples of the considerations involved are discussed, for example, in "MULTIUSER DETECTION FOR CDMA SYSTEMS," by A. Duel-Allen, J. Holtzman and Z. Zvonar (IEEE Personal Communications, Vol. 2, No. 2, pp. 46–58, April 1995) and "MULTI-USER DETECTION FOR DS-CDMA COMMUNICATIONS," by S. Moshavi, (IEEE Communications Magazine, Vol. 34, No. 10, October 1996).

A number of these simpler algorithms have been developed. Some of these use an approach whereby a strongest signal from the received channel is selected. The selected signal is processed to recover data represented by the selected signal. The recovered data are re-processed to generate a replica of the strongest received signal. The replica is then subtracted from the signals in the received channel to provide a modified received signal. The modified received signal is then processed to recover the desired signal without interference that otherwise might have resulted from the strongest signal. One such approach is described in U.S. Pat. No. 5,719,852, entitled "SPREAD SPECTRUM CDMA SUBTRACTIVE INTERFERENCE CANCELER SYSTEM."

A problem that may be encountered in such systems is that the replica of the strongest signal from the received channel may be in error. For example, if the sign of the recovered data is wrong, the subtraction will result in addition of the replica to the received signal, with the result that the MAI caused by mixing of the strongest signal with other signals in the received channel will be worse rather than better.

There are needs, therefore, for methods and apparatus for more effective CDMA receivers.

SUMMARY OF THE INVENTION

The inventors have found that pilot symbols or signals transmitted in CDMA systems may be usefully employed in estimating received signal strength. The estimate of received signal strength may then be used to estimate a probability that a strongest received signal has been correctly decoded. A reconstructed replica of the strongest received signal thereafter may be weighted by multiplying it with a value derived from the estimates, such as a non-linear value, to form a weighted replica of the strongest received signal. The weighted replica may be combined with the received signal to subtract contributions of the strongest received signal from the total received signal. The process then may be re-iterated to sequentially remove progressively weaker received signals until the desired signal is received and decoded without interference from the stronger signals. The accuracy with which the desired signal is decoded is enhanced because interference from stronger signals is reduced.

As a result, when there is a high probability of error in the estimate of the stronger received signals, a replica of the strongest signal is not subtracted from the received signals, and the desired signal is not further corrupted by erroneous corrections. However, when there is a low probability of error in the estimate of the stronger received signals, the desired signal is enhanced by successive subtraction of replicas of these stronger signals. In other words, if the estimated stronger received signal is likely erroneous, it is modified to affect the received signals by only a small amount, if at all, and if the estimate is likely to be correct, it is subtracted from the received signal in its full strength. This provides reduction in multiple access interference between CDMA signals that are simultaneously transmitted via a common channel.

BRIEF DESCRIPTION OF THE DRAWINGS

In the figures, like reference characters identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE PREFERRED EMBODIMENTS

A communication system, and in particular, an apparatus and method for controlling signal interference in the system, is described in detail herein. In the following description, numerous specific details are provided to give a thorough understanding of the invention. One skilled in the relevant art, however, will readily recognize that the invention can be practiced without these specific details, or with alternative elements or steps. In other instances, well-known structures and methods are not shown in detail to avoid obscuring the invention.

Figure 1:
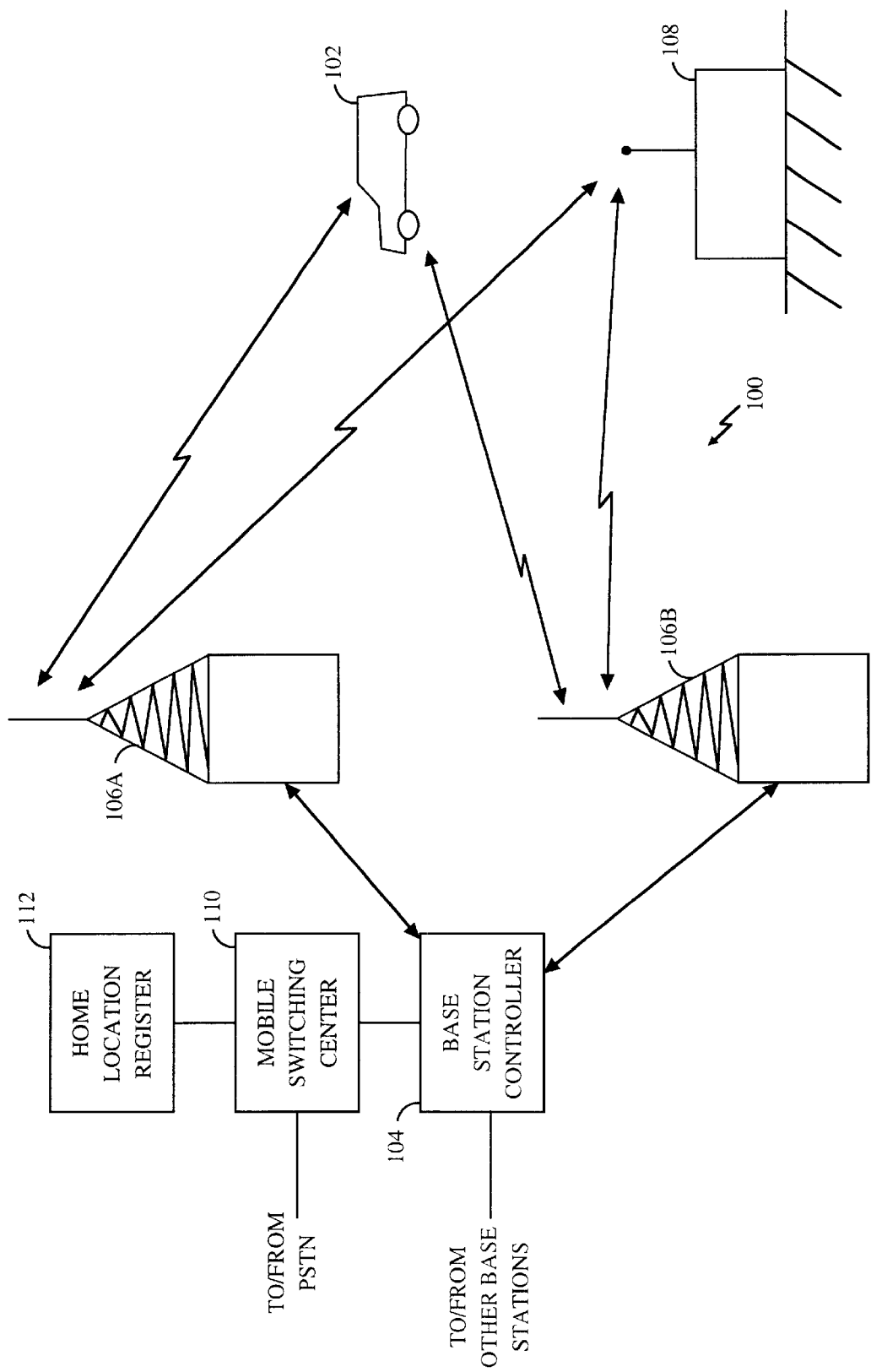
FIG. 1 is a simplified block diagram of a wireless communications system employing the invention.

FIG. 1 illustrates an exemplary cellular subscriber communication system 100, which uses multiple access techniques such as CDMA for communicating between users of user stations (e.g., mobile telephones) and cell-sites or base stations. In FIG. 1, a mobile user station (also referred to as user station or mobile station) 102 communicates with a base station controller 104 through one or more base stations 106a, 106b, etc. Similarly, a fixed user station 108 communicates with the base station controller 104, but through only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations 106a and 106b, and possibly even other base station controllers. The base station controller 104 is coupled to a mobile switching center 110, which in turn is coupled to a home location register 112. During registration of each user station 102 or 108 at the beginning of each call, the base station controller 104 and the mobile switching center 110 compare registration signals received from the user stations 102 or 108 to data contained in the home location register 112, as is known in the art. Soft handoffs may occur between the base station controller 104 and other base station controllers, and even between the mobile switching center 110 and other mobile switching centers, as is known by those skilled in the art.

When the system 100 processes telephone or data traffic calls, the base station controller 104 establishes, maintains and terminates the wireless link with the mobile station 102 and the fixed user station 108, while the mobile switching center 110 establishes, maintains and terminates communications with a public switched telephone network (PSTN). While the discussion below focuses on signals transmitted between the base station 106a and the mobile station 102, those skilled in the art will recognize that the discussion equally applies to other base stations, and to the fixed user station 108.

As an alternative to the separate pilot symbols channel under the IS-95 standard, recent CDMA modulation techniques have been proposed using dedicated time multiplexed ("DTMP") pilot symbols. Under the DTMP approach, separate pilot symbols are time multiplexed on each user's traffic channel. Each user sequentially de-spreads the pilot symbols (and information symbols). Under an alternative common code multiplexed pilot ("CCMP") approach, one co-channel is dedicated to broadcasting a pilot signal. No pilot symbols are multiplexed with dedicated channels, and all users de-spread both the pilot symbols and the modulated information signals in parallel.

In another approach, e.g., the IS-665 standard, the user stations 102 and 108 also transmit pilot signals. The pilot signals are transmitted over the same channel and at the same time as the communications signals. As a result, there is a strong relationship between the pilot and communications signals.

Using any of these techniques or the earlier-referenced IS-95 standard, a pilot signal is transmitted together with signals exchanged between the base station 106a or 106b and the individual user stations 102 or 108. The pilot signal includes data that is known a priori to the receiving stations 102, 106 or 108. As a result, the receiving stations 102, 106 or 108 are able to empirically determine the accuracy with which the pilot signal is decoded. For example, the decoded information from the pilot signal may be compared to the data known a priori to empirically determine a bit error rate. From this and other information, the power level of the received pilot signal, and the error rate with which the pilot signal is decoded, may be accurately estimated. Additionally, signal strength for the pilot signal is related to signal strength for each received signal. Further, multipath characteristics for the pilot and data communications signals are similar. The relationship between the power level of the pilot signal and the power level of the data communications signal may be direct in some communications protocols (for example, where individual pilot symbols are transmitted as part of the desired signal) or may be indirect (for example, where a common pilot signal is transmitted on a co-channel to be shared by several CDMA signals transmitted over a common channel). Pilot-assisted interference is discussed in M. Sawahashi et al., "Pilot Symbol-Assisted Coherent Multistage Interference Cancelling Using Recursive Channel Estimation for DS-CDMA Mobile Radio," IEICE Trans. Commun., vol. E79-B, No. 9, September 1996. They do not, however, use pilot signals to provide weighting for the cancellation as is done under embodiments of the invention.

Figure 2:
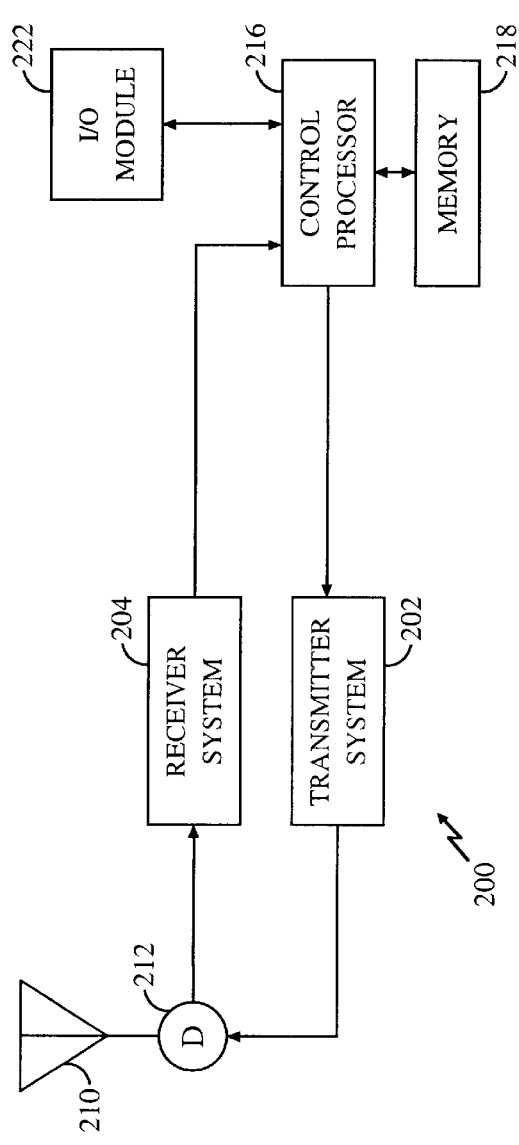
FIG. 2 is a simplified block diagram of a transceiver in the wireless communication system of FIG. 1, in accordance with embodiments of the invention.

FIG. 2 is a simplified block diagram of a portion of a transceiver 200 for use in either the base station 106a or 106b or the user stations 102 or 108 in the wireless communication system 100 of FIG. 1, under embodiments of the invention. In the example of FIG. 2, the transceiver 200 includes a transmitter 202 and receiver 204 sharing an antenna 210 that transmits and receives signals to and from other transceivers 200. A duplexer 212 separates received signals from signals being transmitted by the transmitter 202 and routes the received signals to the receiver 204. The receiver 204 frequency shifts, demodulates and decodes the received signal. For example, the receiver 204 converts received signals to either baseband or an intermediate frequency and performs Walsh code demodulation, and also performs power and signal quality measurements.

A control processor 216 provides much of the processing of the received signal, as described below. A memory 218 permanently stores routines performed by the control processor 216, and provides a temporary storage of data such as received frames. The transmitter 202 encodes, modulates, amplifies and up converts signals to be transmitted.

In one embodiment, the transmitter 202 forms a forward traffic link data signal for re-transmission of received signals from one of the user stations 102 or 108 by the base stations 106a or 106b to another of the user stations 102 or 108. In another embodiment, the transmitter 202 forms a reverse link traffic data signal for transmission from the user stations 102 or 108 back to the base station 106a for re-transmission to another of the user stations 102 or 108. In the mobile station 102, the receiver system 204 provides decoded received data to the user, and accepts information for transmission through the transmitter system 202 from the user, via an I/O module 222 coupled to the control processor 216.

Figure 3:
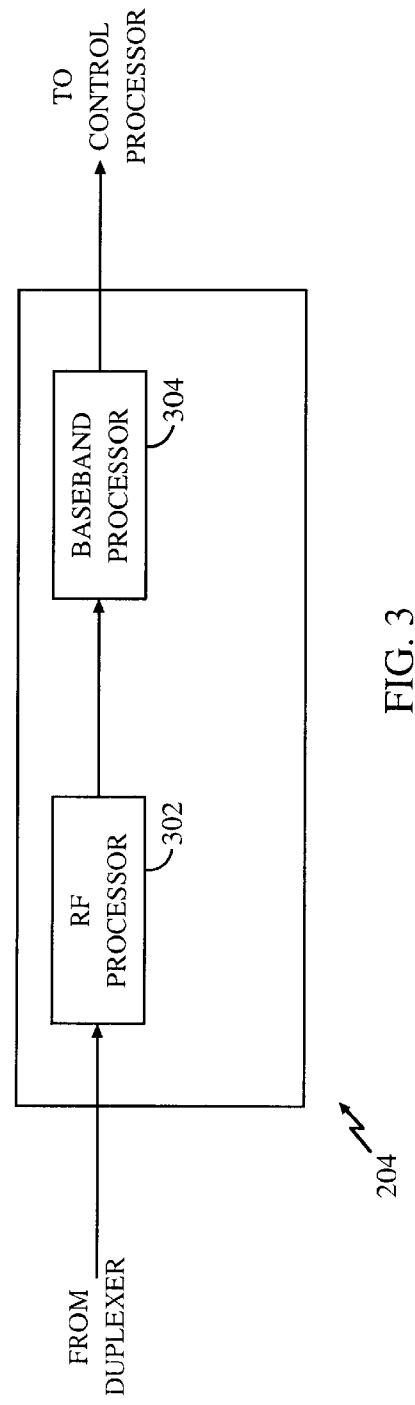
FIG. 3 is a simplified block diagram of a receiver in the transceiver of FIG. 2, in accordance with embodiments of the invention.

FIG. 3 is a simplified block diagram of the receiver 204 of FIG. 2, under embodiments of the invention. The receiver 204 includes an RF processor 302 that accepts a received channel and downconverts this channel to baseband for despreading and decoding of the desired received signal or signals, and the accompanying pilot signals, by the baseband processor 304. The receiver 204 may involve use of one or more RAKE receivers (not shown) for multipath interference compensation, as is known in the art.

In one embodiment, the RF processor 302 includes a first mixer and local oscillator for converting the received channel to an intermediate frequency. After conventional signal conditioning and amplification, the intermediate frequency signal is converted to baseband using conventional mixing techniques. In another embodiment, the RF processor 302 is a direct conversion receiver that mixes the received channel directly to baseband and then applies conventional signal processing techniques to provide the baseband output signals. In either case, or under other known techniques, pilot signals associated with the desired signals are recovered from the received channel by conventional techniques.

The user stations 102 and 108 each are generally concerned with receiving signals having identical propagation characteristics, i.e., signals having all been transmitted via the same channel. Accordingly, a single RAKE receiver is sufficient for multipath interference compensation in the user stations 102 or 108. In the base stations 106a and 106b, multipath compensation requires a separate RAKE receiver for each user station 102 and 108 that is in data communication with the base station 106a or 106b, because the user stations 102 and 108 are at different locations and so will have differing multipath characteristics.

Figure 4:
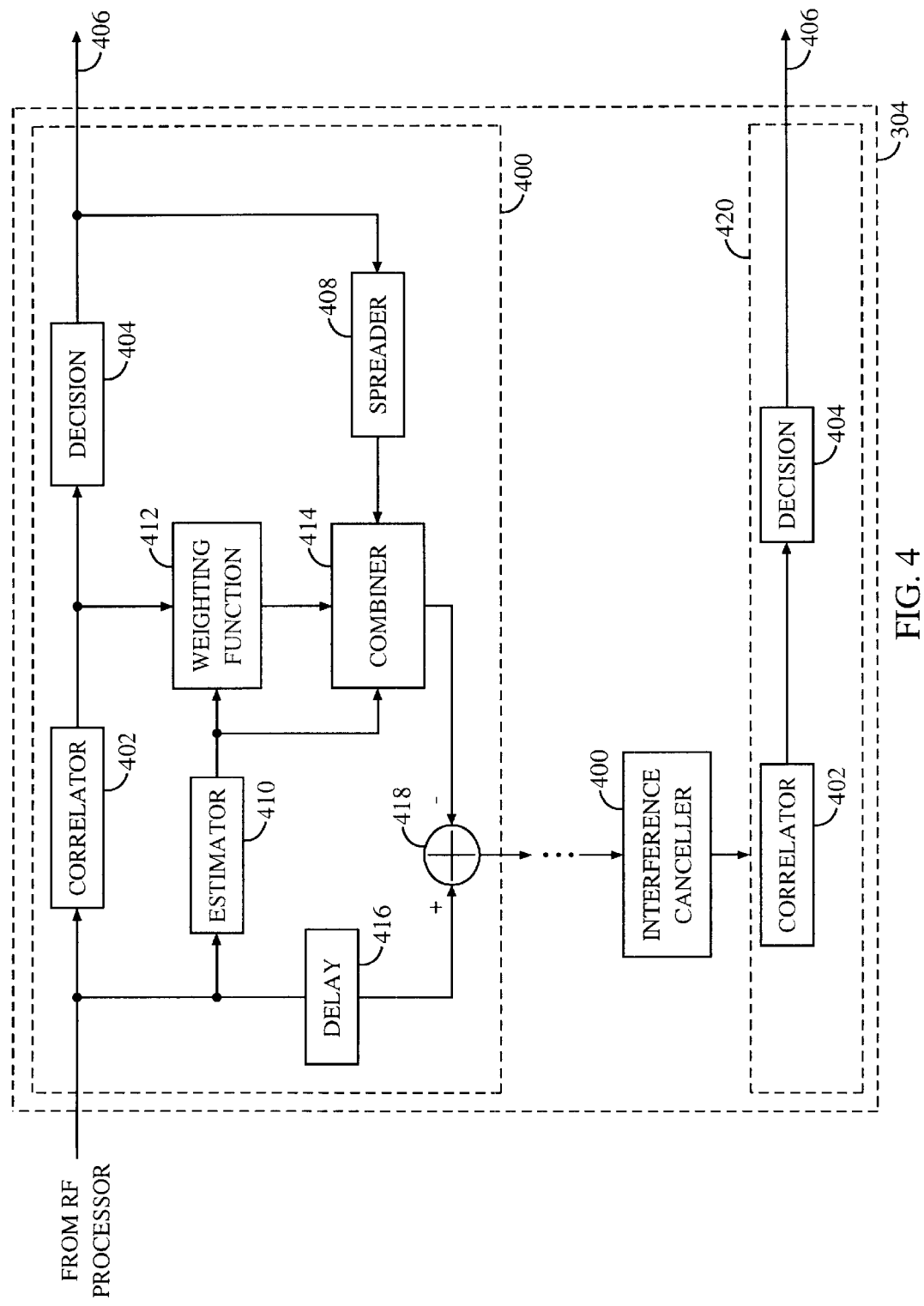
FIG. 4 is a simplified block diagram of an interference cancellation stage for the receiver of FIG. 3, in accordance with embodiments of the invention.

FIG. 4 is a simplified block diagram of one or more interference cancellation stages 400 of the baseband processor 304 of FIG. 3. The baseband signals from the received channel are coupled from the RF processor 302 of FIG. 3 to a correlator 402, which despreads a first signal from the received channel and provides a digital output signal that is an estimate of the received signal strength. In one embodiment, the first signal is chosen to be the strongest received signal for several reasons, although other signals could be selected.

A first reason is that in the base stations 106a or 106b, the strongest signal stands to benefit least from reduction of MAI. A second reason is that the strongest signal is the grossest contributor of MAI for all of the other signals in the channel, and this is true in either the base stations 106a or 106b or in the user stations 102 or 108. A third reason is that the strongest signal is also the signal that can be decoded with highest probability of error-free detection, or, put another way, it is the signal which can be decoded with the highest degree of confidence. As a result, it is also the signal which can most reliably be estimated and subtracted from the received channel.

A variety of techniques may be employed for determining which of the received signals is the strongest. In a first technique, the control processor 216 of FIG. 2 simply rank orders the correlator outputs from the most recently received set of signals. A second technique is to rank order the received separate pilot signal amplitudes from the most recently received set of signals. A third technique is for the control processor 216 of FIG. 2 to monitor the outputs of the correlators 402 as the data is received in a receiver 204 that includes a plurality of correlators 402. The latter technique may be used with base stations 106a and 106b, because greater receiver complexity and size is tolerated in the base stations 106a and 106b than in the user stations 102 and 108(especially in the mobile user stations).

In a conventional CDMA receiver, the output from the correlator 402 is input into a hard decision element 404, which makes a decision based on signals output from the correlator 402 and determines the sign of the decoded data. The hard decision element 404 determines the sign of the amplitude estimate and provides output data at output 406. The output data from output 406 is represented as either +1 or −1. In a conventional base station 106a or 106b, the output data is then re-spread with an appropriate spreading code and transmitted to the intended user station 102 or 108. In the interference cancellation stage 400, this may still occur, however, the data present at output 406 is also re-spread in a spreader 408 to provide a re-spread version of the first received signal using the same Walsh code used to provide the first received signal.

An estimate of the amplitude- for a pilot signal associated with the first signal is provided by a signal estimator 410. The estimate of the pilot signal amplitude may also include information regarding the reliability of the pilot signal reception, because the pilot signal includes information that is known a priori in the transceiver 200 (FIG. 2).

In one embodiment, the pilot estimate provided by a signal estimator 410 is merely the normalized received pilot signal amplitude. In another embodiment, the normalized received pilot signal amplitude is multiplied by a confidence factor of one for zero detected errors in the received pilot signal, zero for a number of errors exceeding a threshold value, and an appropriately scaled value between zero and one for numbers of errors therebetween. Under at least one standard, four pilot symbols are transmitted in each slot for each transmitted frame. The pilot symbols each have a value of +1. So, for example, if four symbols are expected in a given slot, and three are detected, there is a clear indication of corruption in the received signal. In yet another embodiment, the signal estimator 410 includes RAKE analysis of the pilot signal associated with the first signal. The RAKE analysis of the pilot signal associated with the first signal is similar or identical to the RAKE analysis that the first signal would provide because the pilot and first signals have both been transmitted over the same path, at the same time and in the same frequency band.

Figure 5:
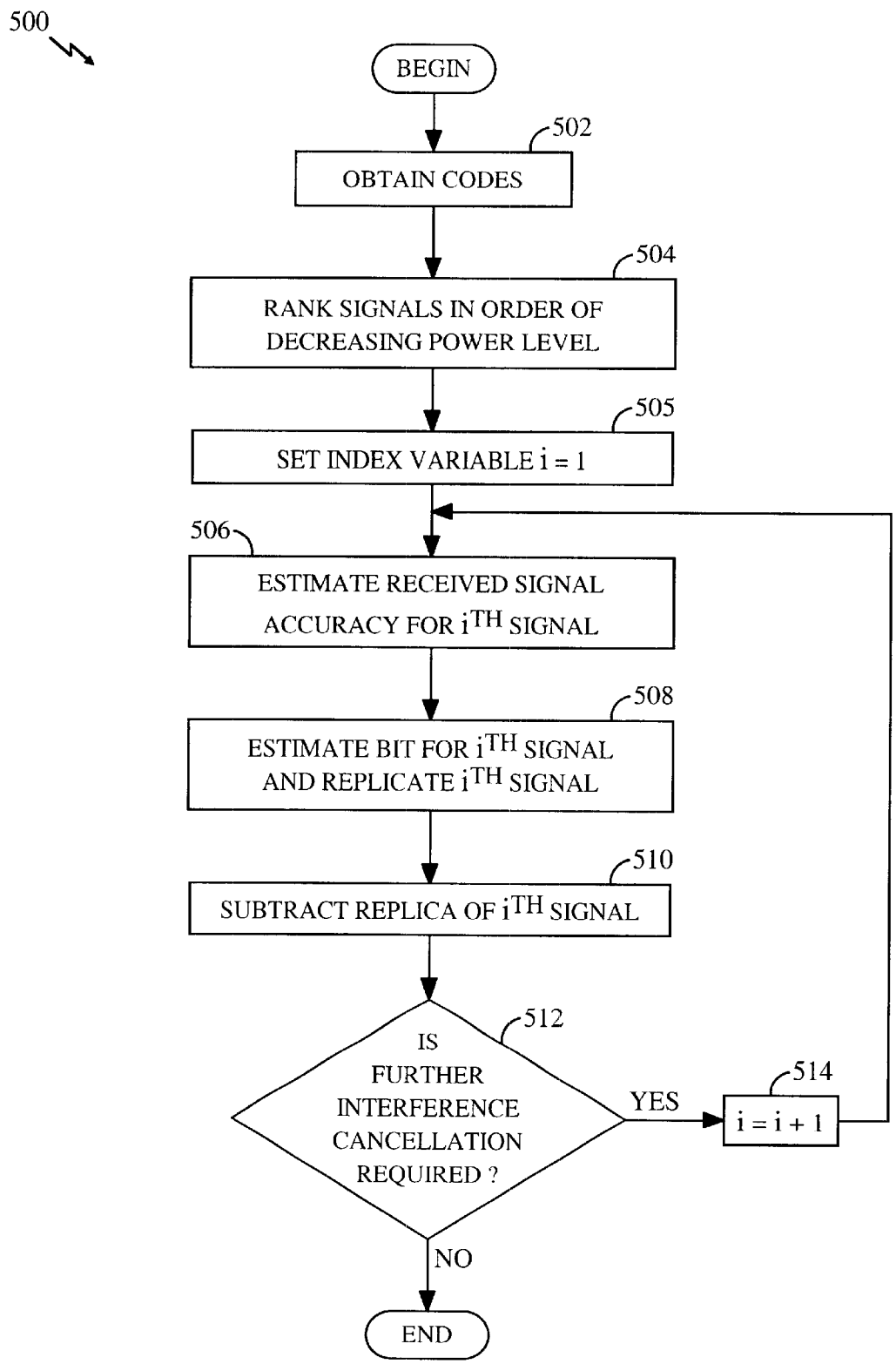
FIG. 5 is a simplified flow chart of a process for reducing multiple access interference in the interference cancellation stage of FIG. 4, in accordance with embodiments of the invention.

A weighting function element 412 compares the estimate of the first signal from the output of the correlator 402 to the signal from signal estimator 410 and determines a weight W to be applied to the re-spread version of the first signal output from the spreader 408. The weight W is discussed in more detail with reference to. FIG. 5 below. The weight W reflects several concerns and may be arrived at in a variety of ways. For example, when the estimate of the first signal from the output of the correlator 402 is large, but the pilot estimate from the signal estimator 410 is small, the estimate of the first signal from the output of the correlator 402 is likely to be in error. When both quantities are large, the estimate of the first signal from the output of the correlator 402 is likely to be correct. In general, the weighting function element 412 determines a confidence level of a correctness of the selected received signal. Based on the confidence level, an appropriate weight is selected. If the confidence level is high, then a weight is selected to effectively cancel the selected received signal as discussed below.

In one embodiment, the weight is multiplied in a combiner 414 by the re-spread signal from the spreader 408. In another embodiment, the weight is multiplied by the amplitude estimate from the pilot signal and the result is multiplied in the combiner 414 by the re-spread signal from the spreader 408. In yet another embodiment, either of these weight schemes is employed, and RAKE analysis of the pilot signal or of the strongest received signal is also used to provide a more faithful replica of the strongest received signal from the combiner 414. In any of these embodiments, a delayed version of the received channel is provided by a delay 416 and the weighted replica of the strongest received signal is subtracted from the received channel in a signal combiner 418. This process then may be repeated in successive interference cancellation stages 400, as denoted by ellipsis, until the desired signal is recovered in a final stage 420 that includes a correlator 402 coupled to a hard decision element 404 having an output 406 coupled to the control processor 216 of FIG. 2.

As a result, a weaker desired signal may be more accurately recovered by the successive interference cancellation stages 400 or the final stage 420, even in the presence of stronger unwanted signals. When the stronger signals are likely to have been accurately estimated, their contributions are removed from the received signal before the desired signal is decoded. When the stronger signals are not likely to have been accurately estimated, estimates of these signals are not introduced into the received channel, and increases in interfering signal strength are thus avoided.

It will be appreciated that the functions implemented by the baseband processor 304 of FIGS. 3 and 4 may be implemented by a custom ASIC, by a digital signal processing integrated circuit, through conventional logic circuit elements or through software programming of a general purpose computer or microprocessor. The RF processor 302 of FIG. 3 may be realized as a monolithic RF processing integrated circuit, as an ensemble of discrete elements or through other conventional RF processor technology.

FIG. 5 is a simplified flow chart of a process 500 for reducing multiple access interference with the interference cancellation stages 400 of FIG. 4, under embodiments of the invention. The process 500 begins in a step 502 with provision of spreading codes for multiple received signals. In a base station 106, the provision of spreading codes for multiple received signals is automatic. In a user station 102 or 108, these codes are normally not available. However, in some situations, the base station 106 may have information that would logically suggest need for such data. For example, the base station 106 may have set a transmission power level for one user station 102 or 108 to be relatively high compared to other user stations 102 or 108, for example, in a situation where the one user station 102 or 108 has relatively poor reception (the so-called "near-far problem"). In situations of this sort, the base station 106 may transmit codes to the other user stations 102 or 108 to allow at least limited successive interference cancellation based on knowledge of relative transmitted signal strength.

The process 500 rank orders signals received via a common channel from strongest to weakest in a step 504. The ranking may be via prior knowledge of transmitted power levels, via monitoring of multiple correlator 402 outputs or through monitoring of pilot signal amplitudes associated with each of the received signals, and may be based on current or prior estimates of received signal strength. As a result of the ranking carried out in the step 504, a first signal is identified. An index variable is set to an initial value in a step 505.

A weight is derived by comparing the signal estimate from a first correlator 402 (FIG. 4) with an estimate of pilot signal strength and accuracy in a step 506. In a first embodiment, the weight is derived by using an appropriately-scaled version AS(pilot) of the estimate of pilot signal strength as an argument of a hyperbolic tangent function, e.g., W_tanh($A_S$(pilot)) or W_tanh($A_S$(pilot)/(correlator output)). The tanh function is used in interference cancellation studies in S. Kaiser and J. Hagenover, "Multi-Carrier CDMA with Interactive Decoding and Soft-Interference Cancellation," Proc. Globecom, 1997, and D. Divsalar et al., "Improved Parallel Interference Cancellation for CDMA," IEEE Trans. Communications, Febuary 1998. They do not, however, use the pilot signals as performed under embodiments of the invention. In another embodiment, the weight is derived by using the estimate of pilot signal strength as an argument x of a function $F(x) = (1-\cos(x))/2$, $0 < x < \pi$, $F(x) = 1$, $x \geq \pi$ to provide a weight $F(x)$. In another embodiment, the weight is derived by using the estimate of pilot signal strength as an argument in a polynomial function, which may be a linear function. In another embodiment, the weight is derived by step function approximations, such as assigning a weight of less than one-half when the normalized estimate of pilot signal strength has a value of less than a first threshold and assigning a weight of greater than one-half when the normalized estimate of pilot signal strength has a value greater than a second threshold, with the second threshold being greater than the first threshold. In general, the weighting function is chosen to provide complete or nearly complete cancellation of the strongest signal when comparison of the pilot signal amplitude and the signal from the output of the correlation 402 indicates that the strongest signal can be cancelled accurately. When the comparison suggests possible errors in cancellation, partial cancellation is attempted. When the comparison suggests that errors in cancellation are likely, no cancellation is attempted.

An estimate of the received bit for the selected signal is formed and a re-spread version of data decoded from the first signal is multiplied by the weight, and may also have multipath correction added, in a step 508 to provide a replica of the first signal. The replica is subtracted from a delayed version of the received channel in a step 510. A query task 512 determines if further interference cancellation is desired. When the query task 512 determines that further interference cancellation is desired, the index variable is incremented in a step 514, and the steps 506 through 512 are repeated for another of the rank ordered signals, such as the second strongest received signal to provide a decoded version of the second strongest signal, if desired, and to remove interference from the second strongest signal from weaker signals. When the query task 512 determines that no further interference cancellation is desired, the process 500 ends.

Although specific embodiments of, and examples for, the invention are described herein for illustrative purposes, various equivalent modifications can be made without departing from the scope of the invention, as will be recognized by those skilled in the relevant art. For example, while many of the above embodiments are shown and described as being implemented in hardware (e.g., one or more integrated circuits designed specifically for this task), such embodiments could equally be implemented in software and be performed by a processor. Such software can be stored on any suitable computer-readable medium, such as micro code stored in a semiconductor chip, as computer-readable disk, or downloaded and stored from a server. The various embodiments described above can be combined to provide further embodiments. In general, the estimation and cancellation techniques described in detail above are examples, and those skilled in the relevant art can create similar techniques under the teachings and concepts of the invention.

The teachings provided herein of the invention can be applied to other communication systems, not necessarily the exemplary communication system described above. For example, while the invention has been generally described above as being employed in the CDMA communication system 100, the invention is equally applicable to other digital or analog cellular communication systems. These techniques can be applied to a base station 106a or 106b, when the system is one where the user stations 102 and 108 also transmit pilot signals, e.g., when the IS-665 standard is employed. The invention can also be modified, if necessary, to employ the systems, circuits and concepts of the various patents described above, all of which are incorporated by reference.

These and other changes can be made to the invention in light of the above detailed description. In general, in the following claims, the terms used should not be construed to limit the invention to the specific embodiments disclosed in the specification and the claims, but should be construed to include any communication system that operates under the claims to reduce amplitude in, or distortions between, transmitted signals. Accordingly, the invention is not limited by the disclosure, but instead its scope is to be determined entirely by the following claims.

What is claimed is:

1. In a communication system having a base station and a plurality of user stations that exchange communication signals between the base station and each of the plurality of users, a method for reducing multiple access interference between transmitted communication signals, the method comprising:

receiving a plurality of code division multiple access signals;

finding a first signal of the plurality of code division multiple access signals that has a greatest amplitude:

receiving a first pilot signal associated with the first signal;

determining parameters from the first pilot signal;

decoding first data from the first signal;

constructing a first replica of the first signal from the first data;

combining the first replica with parameters derived from the first pilot signal to provide a first subtractive signal; and subtracting the first subtractive signal from the plurality of code division multiple access signals to provide a first reduced plurality of code division multiple access signals.

2. The method of claim 1, further comprising:

finding a subsequent signal of the reduced plural of code division multiple access signals that has a greatest amplitude;

receiving a subsequent pilot signal associated with the subsequent signal;

determining parameters from the subsequent pilot signal;

decoding the subsequent signal to provide subsequent data;

constructing a subsequent replica of the subsequent signal from the second data;

combining the subsequent replica with parameters derived from the subsequent pilot signal to provide a subsequent subtraction signal; and subtracting the subsequent subtraction signal from the first reduced plurality of code division multiple access signals to provide a subsequent reduced plurality of code division multiple access signals.

3. The method of claim 1, further comprising:
performing RAKE analysis of at least one of the first pilot signal and the first signal to determine multipath contributions to the first signal; and
reconstructing a first replica of the first signal including multipath contributions to the first signal.

4. The method of claim 1 wherein combining the first replica with parameters derived from the first pilot signal to provide a first subtractive signal comprises:
determining an amplitude of the first pilot signal;
normalizing the amplitude of the first pilot signal to provide a normalized first amplitude;
deriving a weight from the normalized first amplitude; and
multiplying the first replica by the weight.

5. The method of claim 1 wherein combining the first replica with parameters derived from the first pilot signal to provide a first subtractive signal comprises:
determining an amplitude of the first pilot signal;
normalizing the amplitude of the first pilot signal to provide a normalized first amplitude;
using the normalized first amplitude as an argument of a hyperbolic tangent function to provide a weight; and
multiplying the first replica by the weight.

6. The method of claim 1 wherein combining the first replica with parameters derived from the first pilot signal to provide a first subtractive signal comprises:
determining an amplitude of the first pilot signal;
normalizing the amplitude of the first pilot signal to provide a normalized first amplitude;
using the normalized first amplitude as an argument x of a function $F(x)=(1-\cos(x))/2$, $0<x<\pi$, $F(x)=1$, $x \geq \pi$ to providing a weight $F(x)$; and
multiplying the first replica by the weight $F(x)$.

7. The method of claim 1 wherein combining the first replica with parameters derived from the first pilot signal to provide a first subtractive signal comprises:
determining an amplitude of the first pilot signal;
normalizing the amplitude of the first pilot signal to provide a normalized first amplitude;
assigning a weight of less than one-half when the normalized first amplitude has a value of less than a first threshold and assigning a weight of greater than one-half when the normalized first amplitude has a value greater than a second threshold, the second threshold being greater than the first threshold; and
multiplying the first replica by the weight.

8. The method of claim 1 wherein determining parameters from the first pilot signal also includes:
decoding the first pilot signal to provide first pilot signal data;
comparing the first pilot signal data to stored pilot data to determine a number of errors in the first pilot signal data; and
comparing the number of errors to a lookup table to derive a weight.

9. The method of claim 1 wherein determining parameters from the first pilot signal also includes:
decoding the first pilot signal to provide first pilot signal data;
comparing the first pilot signal data to stored pilot data to determine a number of errors in the first pilot signal data; and
assigning a weight of between zero and one when the number of errors exceeds a first threshold number of errors but does not exceed a second threshold number of errors.

10. In a communication system having a base station and a plurality of user stations that exchange communication signals between the base station and each of the plurality of users, an apparatus for reducing multiple access interference between received communication signals, the apparatus comprising:
first means for selecting a first signal from a plurality of received code division multiple access signals;
first means, coupled to the first selecting means, for estimating a confidence level of a correctness of the first signal;
first means, coupled to the first estimating means, for constructing a first replica of the first signal;
first means, coupled to the first constructing means, for determining a weight for the first signal based the estimated confidence level to provide a first subtractive signal; and
first means, coupled to the first determining means, for subtracting the first subtractive signal from the plurality of received code division multiple access signals.

11. The apparatus of claim 10 wherein the first subtracting means includes first means for subtracting the first subtractive signal from the plurality of received code division multiple access signals to provide a first reduced plurality of code division multiple access signals, the apparatus further comprising:
second means, coupled to the first subtracting means, for selecting a subsequent signal from the reduced plurality of code division multiple access signals;
second means, coupled to the second selecting means, for estimating a confidence level of a correctness of the subsequent signal;
second means, coupled to the second estimating means, for constructing a subsequent replica of the subsequent signal;
second means, coupled to the second constructing means, for determining a weight for the subsequent signal based on the estimated confidence level to provide a subsequent subtraction signal; and
second means, coupled to the second determining means, for subtracting the subsequent subtraction signal from the first reduced plurality of received code division multiple access signals.

12. The apparatus of claim 10, further comprising:
second means, coupled to the first selecting means, for selecting a received first pilot signal associated with the first signal;
means, coupled to the second selecting means, for performing RAKE analysis of at least one of the first pilot signal and the first signal to determine multipath contributions to the first signal;
second means, coupled to the RAKE analysis means, for constructing a first replica of the first signal including multipath contributions to the first signal; and
means, coupled to the second constructing means, for forming the first subtractive signal using the first replica.

13. The apparatus of claim 10 wherein the first weight determining means comprises:
second means, coupled to the first selecting means, for selecting a first pilot signal associated with the first signal;

second means, coupled to the second selecting means, for estimating an amplitude of the first pilot signal;

means, coupled to the second estimating means, for normalizing the amplitude of the first pilot signal to provide a normalized first amplitude;

means, coupled to the normalizing means, for deriving a weight from the normalized first amplitude;

means, coupled to the first selecting means, for decoding first data from the first signal;

means, coupled to the decoding means, for constructing a first replica of the first signal from the first data; and means, coupled to the constructing means, for multiplying the first replica by the weight to provide the first subtractive signal.

14. The apparatus of claim 10 wherein the means for deriving a weight comprises:

second means, coupled to the first selecting means, for selecting a first pilot signal associated with the first signal;

second means, coupled to the second selecting means, for estimating an amplitude of the first pilot signal;

means, coupled to the second estimating means, for normalizing the amplitude of the first pilot signal to provide a normalized first amplitude;

means, coupled to the normalizing means, for using the normalized first amplitude as an argument of a hyperbolic tangent function to provide a weight;

means, coupled to the first selecting means, for decoding first data from the first signal;

means, coupled to the decoding means, for constructing a first replica of the first signal from the first data; and means, coupled to the constructing means, for multiplying the first replica by the weight to provide the first subtractive signal.

15. The apparatus of claim 10 wherein the means for deriving a weight comprises:

second means, coupled to the first selecting means, for selecting a first pilot signal associated with the first signal;

second means, coupled to the second selecting means, for estimating an amplitude of the first pilot signal;

means, coupled to the second estimating means, for normalizing the amplitude of the first pilot signal to provide a normalized first amplitude;

means, coupled to the normalizing means, for using the normalized first amplitude as an argument x of a function $F(x)=(1-\cos(x))2$, $0<x<\pi$, $F(x)=1$, $x \geq \pi$ to providing a weight $F(x)$;

means, coupled to the first selecting means, for decoding first data from the first signal;

means, coupled to the decoding means, for constructing a first replica of the first signal from the first data; and means, coupled to the constructing means, for multiplying the first replica by the weight $F(x)$ to provide the first subtractive signal.

16. The apparatus of claim 10 wherein the means for deriving a weight comprise:

second means, coupled to the first selecting means, for selecting a first pilot signal associated with the first signal;

second means, coupled to the second selecting means, for estimating an amplitude of the first pilot signal;

means, coupled to the second estimating means, for normalizing the amplitude of the first pilot signal to provide a normalized first amplitude;

means, coupled to the normalizing means, for assigning a weight of less than one-half when the normalized first amplitude has a value of less than a first threshold and assigning a weight of greater than one-half when the normalized first amplitude has a value greater than a second threshold, the second threshold being greater than the first threshold;

means, coupled to the first selecting means, for decoding first data from the first signal;

means, coupled to the decoding means, for constructing a first replica of the first signal from the first data; and means, coupled to the constructing means, for multiplying the first replica by the weight to provide the first subtractive signal.

17. The apparatus of claim 10 wherein the first selecting means comprises first means for selecting a first signal from a plurality of received code division multiple access signals by a base station.

18. The apparatus of claim 10 wherein the means for estimating a confidence level of a correctness of the first signal also includes:

second means, coupled to the first selecting means, for selecting a first pilot signal associated with the first signal;

means, coupled to the second selecting means, for decoding the first pilot signal to provide first pilot signal data;

first means, coupled to the decoding means, for comparing the first pilot signal data to stored pilot data to determine a number of errors in the first pilot signal data; and second means, coupled to the first comparing means, for comparing the number of errors to a lookup table to derive a weight.

19. A computer-readable medium having instructions stored thereon to cause computers in a communication system to perform a method, wherein the system includes at least a base station exchanging signals with a plurality of user stations, the method comprising:

selecting a first signal from a plurality of received code division multiple access signals;

determining a confidence level of a correctness of the first signal;

determining a weight for the first signal based the determined confidence level to provide a first subtractive signal; and subtracting the first subtractive signal from the plurality of received code division multiple access signals.

20. The article of manufacture of claim 19 wherein subtracting the first subtractive signal from the plurality of received code division multiple access signals includes subtracting the first subtractive signal from the plurality of received code division multiple access signals to provide a first reduced plurality of code division multiple access signals, the method further comprising:

selecting a subsequent signal from the reduced plurality of code division multiple access signals;

determining a confidence level of a correctness of the subsequent signal;

determining a weight for the subsequent signal based on the determined confidence level to provide a subsequent subtraction signal; and subtracting the subsequent subtraction signal from the first reduced plurality of received code division multiple access signals.

21. The article of manufacture of claim 19, further comprising:
   selecting a received first pilot signal associated with the first signal;
   performing RAKE analysis of at least one of the first pilot signal and the first signal to determine multipath contributions to the first signal;
   reconstructing a first replica of the first signal including multipath contributions to the first signal; and
   forming the first subtractive signal using the first replica.

22. The article of manufacture of claim 19 wherein determining a weight comprises:
   selecting a first pilot signal associated with the first signal;
   determining an amplitude of the first pilot signal;
   normalizing the amplitude of the first pilot signal to provide a normalized first amplitude;
   deriving a weight from the normalized first amplitude; and
   multiplying the first replica by the weight to provide the first subtractive signal.

23. The article of manufacture of claim 19 wherein determining a weight comprises:
   selecting a first pilot signal associated with the first signal;
   determining an amplitude of the first pilot signal;
   normalizing the amplitude of the first pilot signal to provide a normalized first amplitude;
   using the normalized first amplitude as an argument of a hyperbolic tangent function to provide a weight;
   reconstructing a first replica of the first signal from the first data; and
   multiplying the first replica by the weight to provide the first subtractive signal.

24. The article of manufacture of claim 19 wherein determining a weight comprises:
   selecting a first pilot signal associated with the first signal;
   determining an amplitude of the first pilot signal;
   normalizing the amplitude of the first pilot signal to provide a normalized first amplitude;
   using the normalized first amplitude as an argument x of a function $F(x)=(1-\cos(x))/2, 0<x<\pi, F(x)=1, x \geq \pi$ to providing a weight $F(x)$;
   reconstructing a first replica of the first signal; and
   multiplying the first replica by the weight $F(x)$ to provide the first subtractive signal.

25. The article of manufacture of claim 19 wherein determining a weight comprises:
   selecting a first pilot signal associated with the first signal;
   determining an amplitude of the first pilot signal;
   normalizing the amplitude of the first pilot signal to provide a normalized first amplitude;
   assigning a weight of less than one-half when the normalized first amplitude has a value of less than a first threshold and assigning a weight of greater than one-half when the normalized first amplitude has a value greater than a second threshold, the second threshold being greater than the first threshold;
   reconstructing a first replica of the first signal; and
   multiplying the first replica by the weight to provide the first subtractive signal.

26. The article of manufacture of claim 19 wherein selecting a first signal from a plurality of received code division multiple access signals comprises selecting a first signal from a plurality of received code division multiple access signals by a base station.

27. The article of manufacture of claim 19 wherein determining a confidence level includes:
   comparing a first pilot signal to stored pilot data to determine a number of errors in the first pilot signal data; and
   determining a weight based on the number of errors.

28. A communication system having a base station and a plurality of user stations that exchange communication signals between the base station and each of the plurality of users, including an apparatus comprising:
   a receiver capable of receiving a plurality of code division multiple access signals and an associated plurality of pilot signals, ranking the signals in order of decreasing amplitude and identifying a first signal having a greatest amplitude;
   an estimator that determines parameters from a first pilot signal associated with the first signal coupled to the receiver;
   a first decoder that decodes first data from the first signal coupled to the receiver;
   a first spreader that provides a first replica of the first signal from the first data, the first spreader coupled to the first decoder;
   a first combiner that combines the first replica with parameters derived from the first pilot signal to provide a first subtractive signal, the first combiner coupled to the first spreader and the estimator; and
   a first subtracter that subtracts the first subtractive signal from the plurality of code division multiple access signals to provide a first reduced plurality of code division multiple access signals, the first subtracter coupled to the first combiner and to the receiver.

29. The communication system of claim 28, wherein the receiver identifies a subsequent signal having a greatest amplitude from the first reduced plurality of code division multiple access signals, the apparatus further comprising:
   a second estimator that determines parameters of a subsequent pilot signal associated with the second signal;
   a second decoder, coupled to the receiver, that decodes the subsequent signal to provide subsequent data;
   a second spreader, coupled to the second decoder, that provides a subsequent replica of the subsequent signal from the subsequent data;
   a second combiner, coupled to the second spreader and to the second estimator, that combines the subsequent replica with parameters derived from the subsequent pilot signal to provide a subsequent subtraction signal; and
   a second subtracter that subtracts the subsequent subtraction signal from the first reduced plurality of code division multiple access signals to provide a subsequent reduced plurality of code division multiple access signals.

30. The communication system of claim 28 further comprising:
   a RAKE analyzer coupled to the receiver that provides a multipath analysis of received signals; and
   a multipath signal reconstructor, coupled to the RAKE analyzer, that reconstructs a first replica of the first signal including multipath contributions to the first signal.

31. The communication system of claim 28 wherein the first combiner comprises:
   an amplitude estimator, coupled to the receiver, that determines an amplitude of the first pilot signal;

a normalizer, coupled to the amplitude estimator, that normalizes the amplitude of the first pilot signal to provide a normalized first amplitude;

a weighting circuit, coupled to the normalizer, that uses the normalized first amplitude as an argument x of a function $F(x)=(1-\cos(x))/2, 0<x<\pi$, $F(x)=1$, $x \geq \pi$ to providing a weight $F(x)$; and a multiplier, coupled to the weighting circuit, that multiplies the first replica by the weight $F(x)$.

32. The communication system of claim 28 wherein the first combiner comprises:

an amplitude estimator, coupled to the receiver, that determines an amplitude of the first pilot signal;

a normalizer, coupled to the amplitude estimator, that normalizes the amplitude of the first pilot signal to provide a normalized first amplitude;

a weighting circuit, coupled to the normalizer, that assigns a weight of less than one-half when the normalized first amplitude has a value of less than a first threshold and that assigns a weight of greater than one-half when the normalized first amplitude has a value greater than a second threshold, the second threshold being greater than the first threshold; and a multiplier, coupled to the weighting circuit, that multiplies the first replica by the weight.

33. The communication system of claim 28 wherein the receiver comprises a base station.

34. The communication system of claim 28 wherein the first estimator includes:

a decoder coupled to the receiver that decodes the first pilot signal to provide first pilot signal data; and logic circuitry coupled to the decoder that compares the first pilot signal data to stored pilot data to determine a number of errors in the first pilot signal data and to derive a weight.

35. The communication system of claim 28 the first estimator includes:

a decoder that decodes the first pilot signal to provide first pilot signal data, the decoder coupled to the receiver;

logic circuitry, coupled to the decoder, that compares the first pilot signal data to stored pilot data to determine a number of errors in the first pilot signal data; and a weighting circuit, coupled to the logic circuitry, that assigns a weight of zero when the number of errors in the first pilot signal data exceeds a threshold number of errors.

36. An apparatus comprising:

a receiver capable of receiving a plurality of code division multiple access signals and selecting a first signal;

a first estimator, coupled to the receiver, that determines a confidence level of correctness associated with the first signal;

a first weighting circuit, coupled to the first estimator and to the receiver, that determines a weight for the first signal based on the determined confidence level to provide a first subtractive signal; and a first subtracter, coupled to the first weighting circuit and to the receiver, that subtracts the first subtractive signal from the plurality of received code division multiple access signals.

37. The apparatus of claim 36, wherein the first subtracter provides a first reduced plurality of received code division multiple access signals and the receiver identifies a subsequent signal from the first reduced plurality of code division multiple access signals, the radio further comprising:

a second estimator, coupled to the receiver, that determines a confidence level of correctness associated with the subsequent signal;

a second weighting circuit that determines a weight for the subsequent signal based on the determined confidence level of the subsequent signal to provide a subsequent subtractive signal; and a second subtracter, coupled to the second weighting circuit and to the receiver, that subtracts the subsequent subtractive signal from the first reduced plurality of received code division multiple access signals.

38. The apparatus of claim 36 further comprising:

a RAKE analyzer coupled to the receiver that provides a multipath analysis of received signals; and a multipath signal reconstructor, coupled to the RAKE analyzer, that reconstructs a first replica of the first signal including multipath contributions to the first signal to provide the first subtractive signal.

39. The apparatus of claim 36 wherein the first weighting circuit comprises:

an amplitude estimator, coupled to the receiver, that determines an amplitude of a first pilot signal associated with the first signal;

a normalizer, coupled to the amplitude estimator, that normalizes the amplitude of the first pilot signal to provide a normalized first amplitude;

a weighting selection circuit, coupled to the normalizer, that uses the normalized first amplitude as an argument x of a function $F(x)=(1-\cos(x))/2, 0<x<\pi$, $F(x)=1$, $x \geq \pi$ to providing a weight $F(x)$; and a multiplier, coupled to the weighting selection circuit, that multiplies the first replica by the weight $F(x)$ to provide the first subtractive signal.

40. The apparatus of claim 36 wherein the first weighting circuit comprises:

an amplitude estimator, coupled to the receiver, that determines an amplitude of the first pilot signal;

a normalizer, coupled to the amplitude estimator, that normalizes the amplitude of the first pilot signal to provide a normalized first amplitude;

a weighting selection circuit, coupled to the normalizer, that assigns a weight of less than one-half when the normalized first amplitude has a value of less than a first threshold and that assigns a weight of greater than one-half when the normalized first amplitude has a value greater than a second threshold, the second threshold being greater than the first threshold; and a multiplier, coupled to the weighting circuit, that multiplies the first replica by the weight to provide the first subtractive signal.

41. The apparatus of claim 36 wherein the first estimator comprises:

a first decoder that decodes a first pilot signal associated with the first signal;

a second decoder that decodes first data from the first signal; and a spreader that re-spreads the first data to provide a replica of the first signal;

wherein the first estimator determines parameters from the first pilot signal to provide the confidence level of correctness.

* * * * *